(12) United States Patent
Fraser

(10) Patent No.: US 9,418,171 B2
(45) Date of Patent: Aug. 16, 2016

(54) ACCELERATION OF RENDERING OF WEB-BASED CONTENT

(75) Inventor: Simon Fraser, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1139 days.

(21) Appl. No.: 12/397,327

(22) Filed: Mar. 3, 2009

(65) Prior Publication Data

US 2009/0228782 A1    Sep. 10, 2009

Related U.S. Application Data

(60) Provisional application No. 61/033,760, filed on Mar. 4, 2008.

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
(Continued)

(52) U.S. Cl.
CPC ................................ *G06F 17/30905* (2013.01)

(58) Field of Classification Search
CPC .................... G06F 17/30905; G06F 17/30899; G06F 17/2247; G06F 17/24; G06F 17/2264
USPC .................................................. 715/234, 236
See application file for complete search history.

(56) References Cited

U.S. PATENT DOCUMENTS 6,016,150 A * 1/2000 Lengyel ............... G06T 11/001
345/426
6,300,947 B1   10/2001 Kanevsky
(Continued)

FOREIGN PATENT DOCUMENTS

EP    1351477 A1    10/2003
EP    1 450 257 A2   8/2004
(Continued)

OTHER PUBLICATIONS

Elina Vartiainen, Virpi Roto, Janne Kaasalainen, "Graphical History List with Multi-Window Support on a Mobile Web Browser", IEEE, 2008, pp. 121-129, Finland.
(Continued)

*Primary Examiner* — Manglesh M Patel
*Assistant Examiner* — Nicholas Hasty
(74) *Attorney, Agent, or Firm* — Blakely, Sokoloff, Taylor & Zafman LLP

(57) ABSTRACT

Systems and methods for hardware accelerated presentation of web pages on mobile computing devices are presented. A plurality of web pages may be received by a computing device capable of processing and displaying web pages using layout engines, hardware accelerated graphics application programming interfaces (APIs). Upon receipt of the web pages, the web pages may be divided into a plurality of rendering layers, based upon stylesheets of the web pages. An algorithm walks through rendering layers so as to select a plurality of layers that may receive compositing layers so as to take advantage of hardware acceleration when rendered. The web pages may be subsequently presented on a display of the mobile computing devices using remaining rendering layers and compositing layers. In this manner, visual representation of web content remains intact even when content which may not have been originally designed for use with layout engine may be displayed.

20 Claims, 7 Drawing Sheets

(51) Int. Cl.
*G06F 17/25* (2006.01)
*G06F 17/26* (2006.01)
*G06F 17/27* (2006.01)
*G06F 17/28* (2006.01)
*G06F 17/30* (2006.01)

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 6,820,133 B1 | 11/2004 | Grove et al. |
| 6,888,536 B2 | 5/2005 | Westerman et al. |
| 7,065,707 B2 | 6/2006 | Chen et al. |
| 7,197,702 B2* | 3/2007 | Niyogi et al. ............... 715/234 |
| 7,272,787 B2 | 9/2007 | Nakamura et al. |
| 7,362,311 B2 | 4/2008 | Filner et al. |
| 7,412,644 B2* | 8/2008 | Kieffer ........................ 715/234 |
| 7,417,645 B2 | 8/2008 | Beda et al. |
| 7,446,781 B2* | 11/2008 | O'Donnell ............ G06T 15/503 345/629 |
| 7,499,051 B1 | 3/2009 | O'Donnell |
| 2002/0078115 A1 | 6/2002 | Poff et al. |
| 2003/0023755 A1* | 1/2003 | Harris et al. .................. 709/246 |
| 2003/0237053 A1 | 12/2003 | Chen et al. |
| 2004/0012627 A1 | 1/2004 | Zakharia et al. |
| 2004/0221004 A1 | 11/2004 | Chalfin et al. |
| 2004/0227767 A1* | 11/2004 | Baroncelli ............ G06T 11/40 345/589 |
| 2005/0012751 A1 | 1/2005 | Karlov |
| 2005/0041031 A1 | 2/2005 | Diard |
| 2005/0088446 A1 | 4/2005 | Herrick et al. |
| 2005/0154982 A1 | 7/2005 | Berg |
| 2006/0132491 A1 | 6/2006 | Riach et al. |
| 2006/0267990 A1 | 11/2006 | Rogers et al. |
| 2007/0018992 A1* | 1/2007 | Wong ........................... 345/545 |
| 2007/0113179 A1 | 5/2007 | Gibbs et al. |
| 2007/0153004 A1* | 7/2007 | Airey ..................... G06T 13/00 345/473 |
| 2007/0169066 A1* | 7/2007 | Nielsen .......................... 717/162 |
| 2007/0192818 A1 | 8/2007 | Bourges-Sevenier et al. |
| 2007/0250728 A1 | 10/2007 | Riach et al. |
| 2007/0288841 A1 | 12/2007 | Rohrabaugh et al. |
| 2007/0294646 A1 | 12/2007 | Timmons |
| 2008/0034292 A1* | 2/2008 | Brunner et al. ................ 715/700 |
| 2008/0074432 A1 | 3/2008 | Sun et al. |
| 2008/0082907 A1* | 4/2008 | Sorotokin ............. G06F 17/212 715/210 |
| 2008/0120626 A1 | 5/2008 | Graffagnino et al. |
| 2008/0148144 A1 | 6/2008 | Tatsumi |
| 2009/0225093 A1 | 9/2009 | Harper |
| 2010/0153583 A1* | 6/2010 | Harris et al. .................. 715/236 |

FOREIGN PATENT DOCUMENTS

| | | |
|---|---|---|
| EP | 1 450 257 A3 | 8/2004 |
| WO | WO 2008/019222 A1 | 2/2008 |

OTHER PUBLICATIONS

PCT Search Report and Written Opinion for PCT/US2009/001426 mailed Aug. 4, 2009, 12 pages.
PCT Search Report and Written Opinion for PCT/US2009/001414 mailed Jul. 2, 2009, 16 pages.
Ribble, Maurice, "Next-Gen Tile-Based GPUs," GameDevelopers Conference Mobile 08, San Francisco, Feb. 18-22, 2008, XP007908783, http://ati.amd.com/developer/gdc/2008/gdc2008_ribble_maurice_TileBasedGpus.pdf, pp. 1-36.
Akenine-Mökker T., et al., "Real-Time Rendering, Graphics Hardware, Case Study: Kyro," Real-Time Rendering, Natick, Mass., Jan. 1, 2002, XP002517007, pp. 705-708.
PCT Search Report and Written Opinion for PCT/US2009/001416 mailed Jun. 30, 2009, 12 pages.
European Examination Report for European Patent Application No. 09716721.7, dated Mar. 3, 2016, 5 pgs.

* cited by examiner

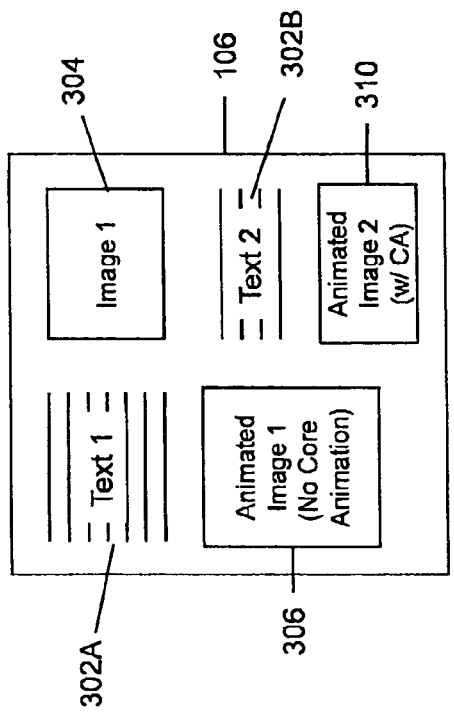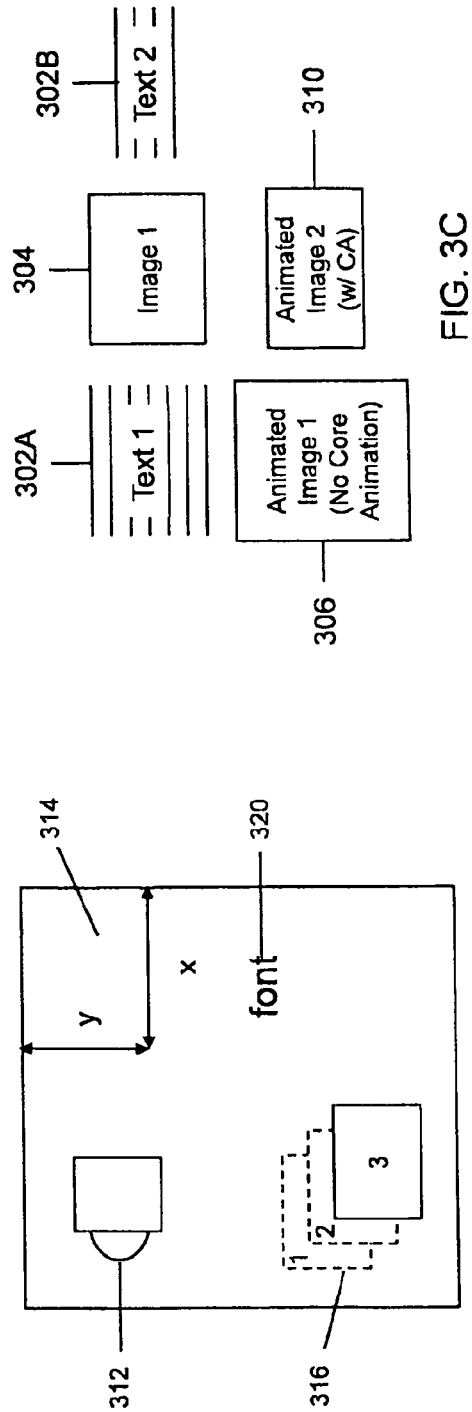

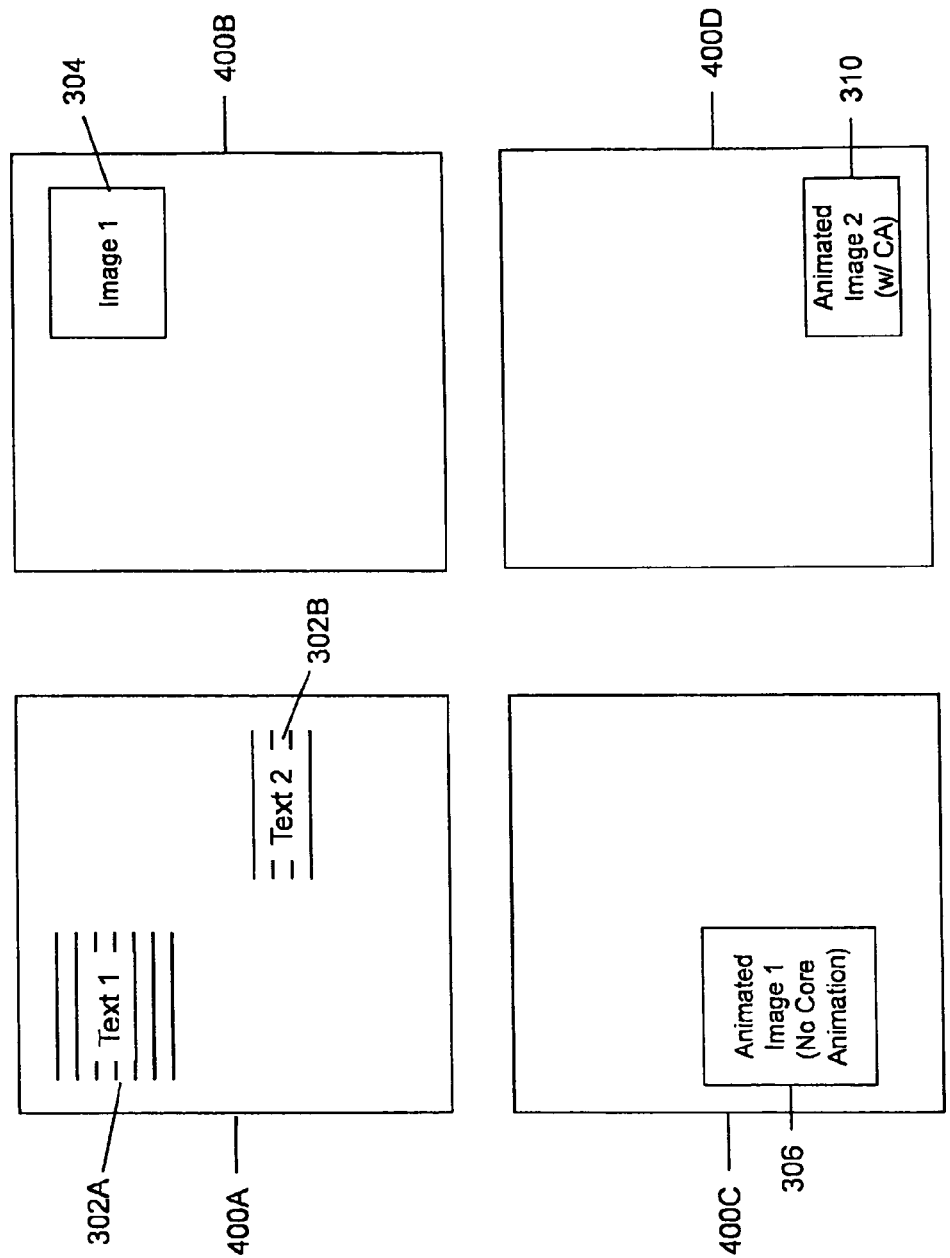

ACCELERATION OF RENDERING OF WEB-BASED CONTENT

This application claims priority to U.S. Provisional Application No. 61/033,760 filed on Mar. 4, 2008, which provisional application is incorporated herein by reference in its entirety.

FIELD OF INVENTION

This disclosure relates to display of web-based content.

DESCRIPTION OF RELATED ART

With increasing use of computers to deliver content such as information and entertainment, web pages designed to display such content have become increasingly complicated over time, containing not only text but also animation and videos. Goals of web developers may be to present this content in visually appealing and timely fashion. Accordingly, developers may consider how to create and manage display of such content when designing web pages.

With improved support for Cascading Style Sheets (CSS) in web browsers, web developers have been able to make use of CSS to control presentation of documents written in hypertext markup language (HTML) independently of its content. Each content element within a web page may be assigned a set of stylistic rules that dictates presentation of that element. In this manner, markup pages can be presented in different styles.

CSS further provides priority schemes that determine which style rules are applied if more than one rule matches a particular content element. This behavior may be referred to as cascade and makes use of weights that are calculated and assigned to rules to provide predictable outcomes. CSS styles can be provided in separate documents or embedded in markup documents. Style sheets can be imported and alternative style sheets specified for user selection.

CSS provides various facilities to control both the appearance of single elements on web pages, for example their size and background color, and how various different elements on pages may be presented visually with respect to each other. For example, properties may be provided that control back-to-front ordering of different elements, and whether elements "clip" elements inside of it. These rendering behaviors may be described by Cascading Style Sheets specifications.

Web pages have traditionally been static collections of text and images. However, as computing performance has increased, and browser technology has improved, web page designers are making frequent use of animated content in web pages, either through JavaScript, or by using plug-ins. However, animation performance remains limited because of the overhead associated with recomputing positions, and redrawing all elements, of web pages as animation runs. This may be particularly true when running on mobile computing devices, which have limited computing power.

Web browsers may therefore choose to make use of hardware acceleration in presentation of animated web page content, whereby certain content elements of web pages may be rendered into hardware textures, and then moved and composited via graphics processing units of mobile computing devices. However, rendering certain page elements via hardware may necessarily alter the visual presentation of pages; those elements may be presented on top of non hardware-rendered content, and thus may cause a layout engine to violate presentation rules described in Cascading Style Sheets specifications.

BRIEF DESCRIPTION OF DRAWINGS

Exemplary embodiments of invention may be explained in greater detail in following description and are illustrated in drawings, in which:

FIGS. 3A-3C illustrate web pages and deconstruction of web pages into document presentation and content using stylesheets; and FIG. 4 illustrates one embodiment of rendering layers for web pages received by mobile computing device of FIG. 1.

DETAILED DESCRIPTION

Embodiments presently disclosed may relate to systems and methods for hardware accelerated rendering of web pages on mobile computing devices. A plurality of web pages may be received by mobile computing devices capable of processing and displaying web pages using hardware accelerated graphics application programming interfaces (APIs). Upon receipt of web pages, devices divide web content into plurality of rendering layers. Rendering layers may be employed to determine actual display of web pages, which may be compared with intended display of web pages based on their stylesheets. Significant deviations between actual and intended displays may be determined and algorithms may be employed to substantially minimize these deviations. In one embodiment, an algorithm selects portions of the plurality of rendering layers to receive hardware-backed layers, allowing selected layers to be hardware-accelerated when rendered. In this manner, visual representation of web pages can continue to conform to a specification, while subsets of page elements may be animated in hardware.

Advantageously, an algorithm may be adapted to web page content, as well as the status of mobile computing devices at the time of rendering web pages. The algorithm may base its selections upon factors which include, but are not limited to, relative placement of web page content, desired rendering order of web page content, whether web page elements overlap one another, requested animation effects represented by web page content, available processing resources, and memory. These and other advantages are discussed in detail below.

The processes presented herein may be described in terms of sequential operations; however, it may be appreciated that some operations may be performed in different orders. Moreover, some operations may be performed in parallel, rather than sequentially. Furthermore, some operations may be omitted, as necessary.

Embodiments may be described with reference to accompanying Figures, wherein like numerals refer to like elements throughout. The terminology used in the description presented herein is not intended to be interpreted in any limited or restrictive manner, simply because it may be utilized in conjunction with the detailed description of certain embodiments. Furthermore, disclosed embodiments may include several novel features, no single one of which may solely responsible for its desirable attributes or which may be essential to practicing inventions herein described.

Figure 1:
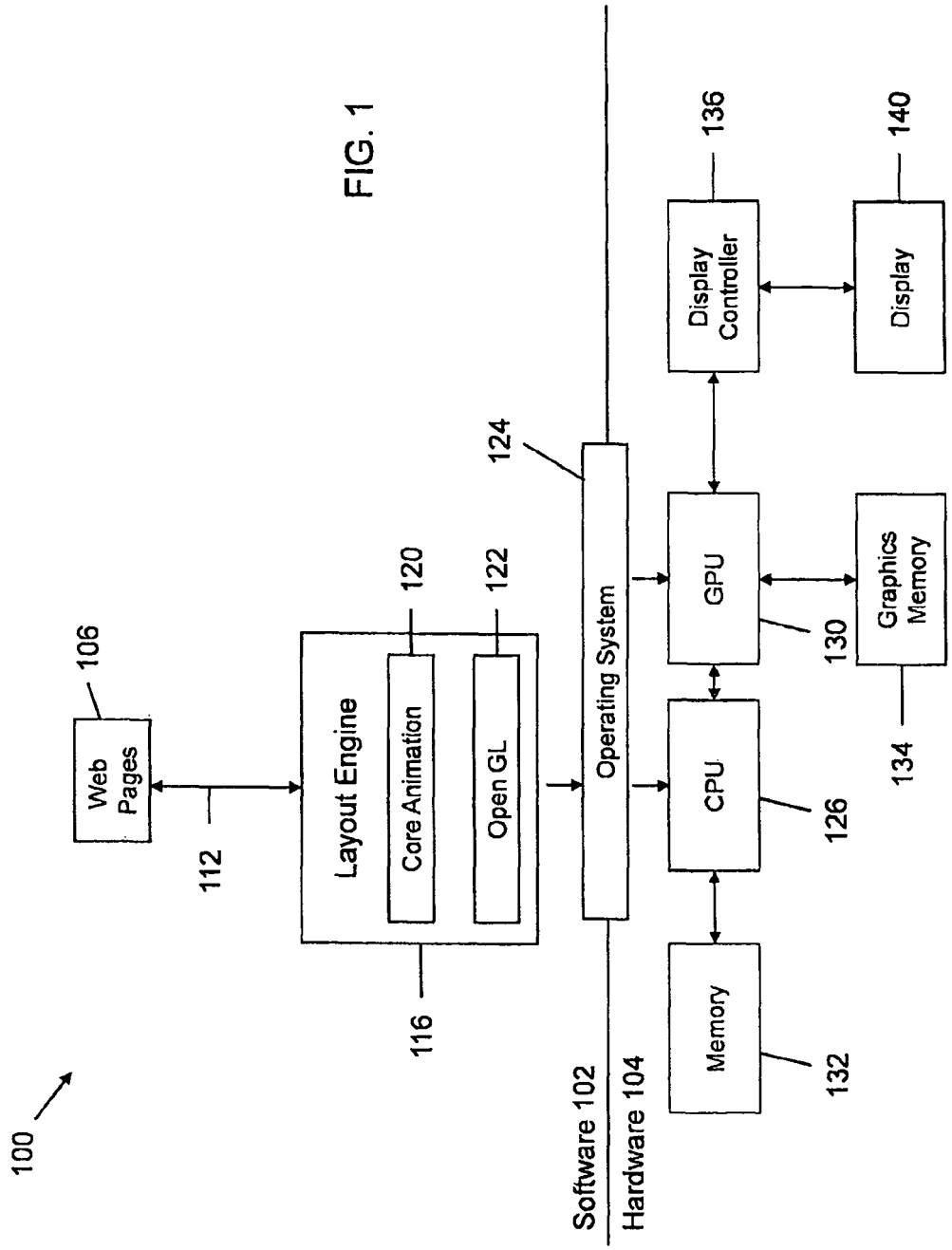
FIG. 1 illustrates one embodiment of mobile computing devices capable of performing hardware accelerated display of web pages.

FIG. 1 illustrates one embodiment of mobile computing device 100 configured for receiving and displaying web pages 106. Device 100 can include a plurality of software applications 102 that are configured to analyze web pages 106 and generate instructions for rendering web pages 106. Device 100 further can include hardware 104 for executing generated instructions and displaying web pages 106 to users of device 100. Mobile computing device 100 can be any device that may be capable of rendering and displaying web content, such as computers, mobile devices, personal digital assistants, and like.

Mobile computing devices 100 may be in communication with network 112 which delivers pluralities of web pages 106 to mobile computing devices 100. Network 112 may include Local Area Networks (LANs), Wide Area Networks (WANs), intranets, extranets, and Internet. Network 112 may be further implemented using wired communication mechanisms, wireless communication mechanisms, and combinations thereof. In certain embodiments, mobile computing device 100 can be, or include, Apple iPhones™.

When received by mobile computing device 100, web pages 106 may be provided to layout engine 116 for web browsers. Layout engine 116 can include plurality of facilities to parse web page 106 into elements and compute visual presentation of those elements taking style into account, and to render those elements on mobile computing device 100. Rendering may be performed via a plurality of graphics application programming interfaces (APIs) that generate instructions that may be used by hardware 104 to display two-dimensional and three-dimensional computer graphics. In one embodiment, one or more graphics APIs may be OpenGL 122. Graphics APIs may further be selected from graphics APIs capable of enabling hardware acceleration, such as Core Animation™ (Apple Inc.) 120. OpenGL may also be used in embodiments to enable hardware acceleration.

Layout engine 116 may be communicatively coupled, through operating system 124, to hardware 104. Hardware 104 may include, but may not limited to, plurality of processors 126, 130, plurality of memory 132, 134, at least one display controller 136, and at least one display 140. Operating system 124 may further include plurality of drivers, not shown, which facilitate communication between hardware 104 and software 102.

Processors 126, 130 can include, for example, general purpose processors, such as central processing unit (CPU) 126 and specialty processors, such as graphics processing unit (GPU) 130. CPU 130 may comprise plurality of core logics, such as two dimensional (2D) cores and/or three-dimensional (3D) cores that process different types of graphics data and may use different kinds of graphics resources. Output of GPU 130 may be stored in graphics memory 134 which may be fetched by display controller 136 for display on display 140. For example, GPU 130 may employ graphics memory 134 dedicated to storing information used for processing of graphics, while CPU 126 may employ memory 132 shared by CPU 126 and other components of device 100.

Figure 2:
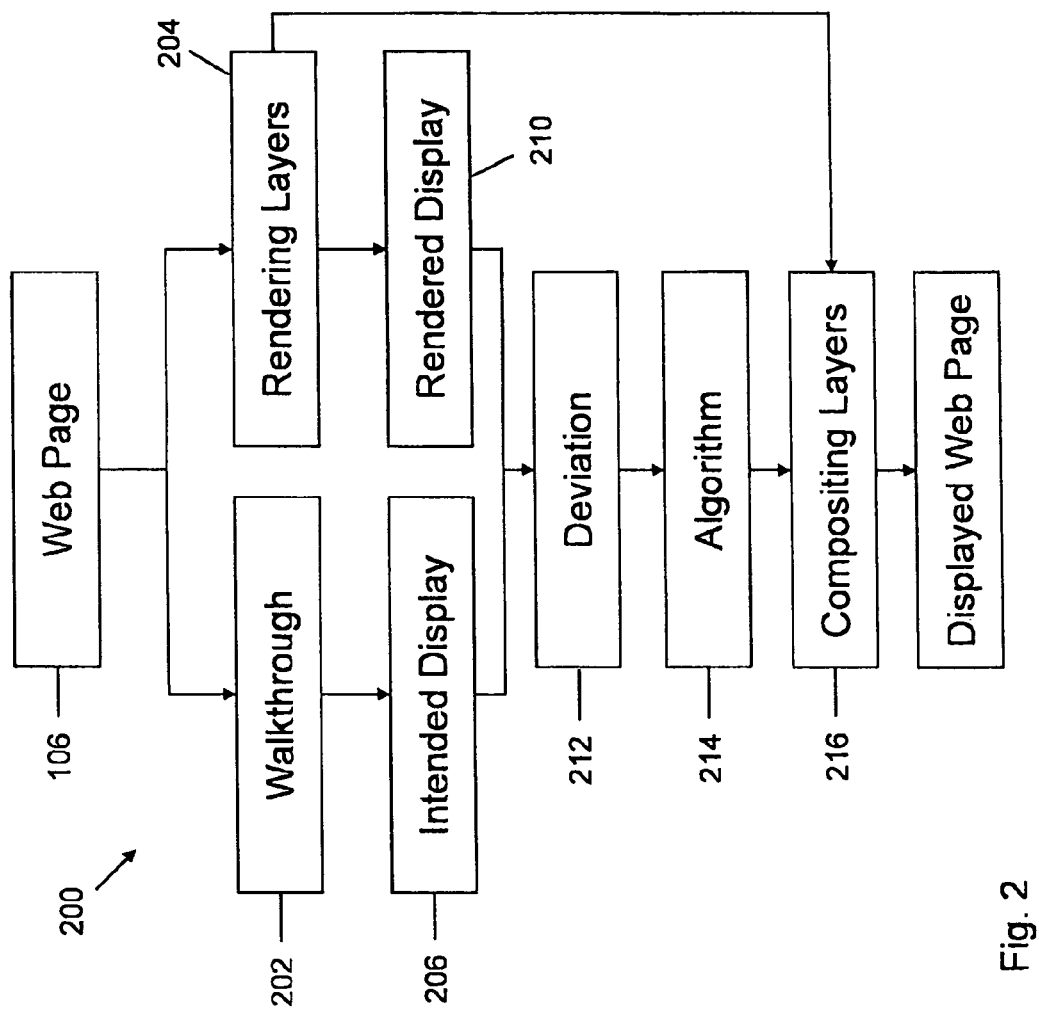
FIG. 2 illustrates one embodiment of rendering processes which substantially inhibits display of rendering artifacts.

FIG. 2 illustrates one embodiment of process 200 which analyzes and modifies rendering of web pages so as to substantially inhibit display of rendering artifacts. In certain embodiments, process 200 may be implemented by layout engine 116. In general, layout engine 116 downloads HTML/XHTML files from network 112; these describe page content, and to some extent presentation via attributes on HTML tags, and by virtue of existing HTML layout rules. Layout engine 116 then parses HTML into trees of document nodes, where types of nodes and their relations are described by the Document Object Model (DOM) specification. Next, layout engine 116 may download any CSS files that may be referred to by web pages 106, directly or indirectly, and looks at CSS rules which may be inline in web pages 106. Layout engine 116 may also download JavaScript files that may be referred to by web pages 106, directly or indirectly. JavaScript code may also change styles that are applied to elements.

Layout engine 116 may compute visual presentation for elements on pages, which may be determined by standard rendered appearance for various types of elements, and then how appearance of various elements may be changed by CSS style rules. In addition, layout engine 116 may compute position on page, and display order of each of elements, based on style rules and interactions between elements.

As part of computing element positions and display order, layout engine 116 may build hierarchies of objects that control rendering of some subset of elements, which may be referred to as rendering layers.

Of note, layout engine 116 may look at styles and potentially other things to determine that some subset of rendering layers should be hardware accelerated/composited. Layout engine 116 may then analyze hierarchy of rendering layers to determine which other rendering layers may require hardware compositing in order to preserve visual appearance of web page 106.

In one embodiment, layout engine 116 identifies intended display 206 of web pages 106. For example, intended display 206 may be identified by processes of walking through 202 of plurality of stylesheets of web pages 106. In certain embodiments, stylesheets may be provided in Cascading Style Sheets (CSS) language.

As illustrated in FIGS. 3A-3C, web pages 106 (FIG. 3A) may be divided into content (FIG. 3C) and document presentation (FIG. 3B), which can be written in CSS. Examples of content may include, for example, text 302A, 302B, static images 304, animations designed to take advantage of hardware accelerated rendering 310, and non-accelerated animations 306. Animations 306 may represent operations that modify existing content, and may be treated like other CSS properties, like font face or color.

A plurality of document presentation rules may be applied to web page content. Rules may include, for example, static and dynamic positioning in two dimensions 314, content visibility 312, and fonts 320. For example, rules may specify front-to-back orders (z-index) that relates to stacking index 316. CSS can further specify priority schemes for web page content which decides what stylistic rules may be applied when multiple rules may be available to pieces of content. Using positioning, content may be placed at any desired location within web page 106. Using overflow, behavior of elements whose contents spill outside of their box may be controlled. Visibility may be further to show or hide pieces of content.

Index 316 may be used to specify in what order content may be drawn when elements on page overlap. Font parameters may be used to vary type, size, and style of displayed text. Simple animations may be generated by adjusting content formatting which may include, for example, position of content over time, content visibility, and presentation of plurality of images.

Thus, by walking through formatting instructions within CSS of web pages 106, intended display 206 of web pages 106 may be determined.

In further embodiments, pluralities of rendering layers 204 may be generated by layout engine 116 to determine rendered display 210 of web pages 106. Rendering layers 204 comprise hierarchies of objects, each of which may render related subsets of content of pages. Rendering layers 204 in this hierarchy each paint their content in predetermined sequences in order to generate visual representation of web pages 106. Example rendering layers 400A-400D derived from web page 106 are illustrated in FIG. 4.

Process 200 may also determine which rendering layers 204 may require hardware-backing, by virtue of their being style, or other sources of input, that indicates that these layers may be subject to animations, or may have presentation that may be only possible when rendering through 3D APIs. For example, if elements have non-affine transforms, such as through rotation transform with perspective, then these operations may be better suited for hardware-backing.

In process 200, it may also be determined which other rendering layers 204 may require hardware backing, in order to maintain visual representation of pages. For example, page elements which may normally render on top of something that received hardware-compositing layer in previous steps may need themselves to get hardware layers, so they may continue to be rendered on top. Rendered layers 204 may be used by process 200 to determine rendered display 210. Rendered display 210 may be compared to intended display 206 to determine deviation 212.

From this analysis, algorithm 214 selects portions of rendering layers 204 and modifies selected layers, referred to herein as compositing layers 216, so that they may work in conjunction with graphics APIs for hardware accelerated rendering. In one embodiment, selected rendering layers 204 are painted into corresponding layers to obtain compositing layers 216. In this manner, displayed web page 218 is generated from combinations of remaining rendering layers 204 and compositing layers 216. Displayed web page 218 is substantially the same as intended display 206. It may be understood that this process may be iterated, as necessary, to achieve this result.

Embodiments of algorithm 214 may select rendering layers 204 used to generate compositing layers 216 based upon pluralities of factors. Factors may include, for example, relative placement of web page content, desired rendering order of web page content, whether web page content overlaps one another, and requested animation effects represented by web page content. Algorithm 214 may further base its selections on available processing resources, memory, and like concerns.

In algorithm 214, layout engine 116 constructs hierarchies of rendering layers in order to paint contents of web pages 106 in correct back-to-front order. Hierarchy of rendering layers may be based upon structure of the web.

Layout engine 116 may compute, from this first hierarchy, a new hierarchy of rendering layers, by taking into account styles that affect front-to-back ordering of page elements (i.e. z-index), and styles that force elements to become a "stacking context". Within a stacking context, child elements may be sorted according to their z-order, but elements within different stacking contexts may not inter-sort.

Styles associated with elements for each rendering layer may then be examined, and layout engine 116 may make decisions about whether current rendering layers require hardware compositing support. Criteria used to make this decision can include, but are not limited to: whether style rules that are applied to elements for this layer that assign animations, including transient transitions, in certain properties, such as opacity, or display transforms; whether style rules that are applied to elements for this layer that describe display transforms that may be difficult with available 2D drawing APIs, such as non-affine transforms; whether elements associated with rendering layers 204 would benefit from hardware compositing (for example, elements that display video may be able to display much more efficiently if they may be rendered into hardware-composited destinations).

Layout engine 116 may perform second passes over hierarchies of rendering layers in order of their visual presentation (back to front), and additional rendering layers can be assigned hardware compositing layers for secondary reasons which include, but are not limited to, following criteria.

For example, layout engine 116 may consider whether rendering layers 204 should be drawn in front of another hardware-composited rendering layer in order to preserve visual presentation of pages. Algorithm 214 may take into account locations of rendering layers on screen, and may only assign hardware-composited layers when overlap is detected, but in this case algorithm 214 may detect when a change in page display, including animations, could affect that overlap, and assign additional hardware compositing layers.

Layout engine 116 may also consider whether rendering layers 204 have styles that causes them to clip their child elements (i.e. "overflow" style), and one or more of their child elements may be rendered into hardware-composited rendering layer. These hardware compositing layers may be utilized since those hardware-composited child elements may not be clipped by standard clipping mechanisms used in software-rendering code path, both because they may be hardware-accelerated, and because clipping itself may be implemented with hardware acceleration since contents of rendering layers 204 may experience hardware-accelerated animations.

Layout engine 116 may further inspect rendering layers that have been assigned compositing layers in either of previous steps, and identifies situations in which single rendering layers, which may have been assigned hardware composited layers, may need to create and maintain more than one hardware compositing layer. These situations can include, but are not limited to, following situations: if rendering layers may be stacking contexts, and they may have hardware-composited children with negative z-index, then additional layers may be created for content of that rendering layer's element. This may be useful to preserve visual representation that employs negative z-index children to render in front of that element's background, but behind its content.

Also, if rendering layers 204 have "overflow" style that may cause them to clip their children, and that rendering layer is not a stacking context, and one of more of its children are associated with hardware-composited layers, then additional hardware-compositing layers may be useful to effect clipping of those children. This may be useful because elements with "overflow" style may not automatically become a stacking context, and so may not necessarily act as parent of its clipped child layers in rendering hierarchy.

If elements may have been assigned rendering layers in order to optimize display of that element (e.g. video), but that styles prescribe additional box decorations on that element, such as borders, then additional hardware compositing layers may be created to render those box decorations, thus preserving efficiency of display of that element.

Hardware-compositing layers may have processing costs, in terms of memory required for their associated data structures and backing store (when necessary), and computational requirements for their creation and maintenance. In some embodiments, layout engine 116 may be configured to minimize the number and size of hardware compositing layers that may be created via several techniques including, but not limited to: rendering layers 204 which may be a stacking context, and may have no child elements that may require hardware compositing, can always be rendered into hardware compositing layer associated with it, or some parent rendering layer; elements that draw behind elements that have hardware compositing layers may be rendered into hardware layers associated with some parent rendering layer, or into drawing destination of non-hardware-accelerated elements of pages; hardware-compositing layers created for rendering layers 204 and their non-accelerated children may need be only large enough to contain those elements, including any box decorations such as outlines and shadows, and may be no larger.

Both page content, and styles applied to elements on pages may change after pages have been loaded in response to user activity, or directly or indirectly through JavaScript. When changes are detected that impact visual presentation of elements on pages, layout engine 116 may execute its algorithms 214 over all or part of hierarchy of rendering layers 204 to ensure that sets of hardware compositing rendering layers may be updated in order to preserve that visual presentation of pages.

In many cases elements associated with hardware-compositing layers created by algorithm 214 may be rendered into those hardware compositing layers via system-provided drawing APIs. This may be for elements that present mixtures of text, images, borders etc. This may also indicate that such hardware composited layers require memory buffers, or backing stores, to preserve rendered presentation, this memory buffer may be uploaded to graphics processing hardware for compositing on display by that hardware.

Allocating memory buffers for hardware compositing layers can make use of system resources, but may be minimized in various embodiments. To achieve this, algorithm 204 may be modified to detect certain configurations of elements within rendering layers, which may be presented by available hardware-accelerated graphics API without allocation of a backing store. These configurations may include, but are not be limited to: rendering layers associated with elements that have no visible content, but simply act as containers for their child rendering layers. In this case hardware-accelerated layers may be assigned to those rendering layers, but those hardware-accelerated layers may simply participate in geometry calculations for children, and may not do any drawing of their own.

Rendering layers may be associated with elements that have solid background colors, but may have no other content that may be rendered into that same rendering layer. In this case instructions to draw solid background colors may be passed via hardware-accelerated graphics API to underlying graphics processors, which may fill areas of screen with solid colors much more efficiently than may be possible via software-based drawing APIs. Rendering layers may also be associated with elements that display images. In this case, decoded pixels of images may be passed to hardware-accelerated graphics APIs to be used as graphics textures, without having to render them via software-based drawing APIs. Thus, when page content or styles change, algorithm reexamines page elements, and if it detects any of these configurations, it may reconfigure sets of hardware-accelerated rendering layers to take advantage of them.

Figure 5A:
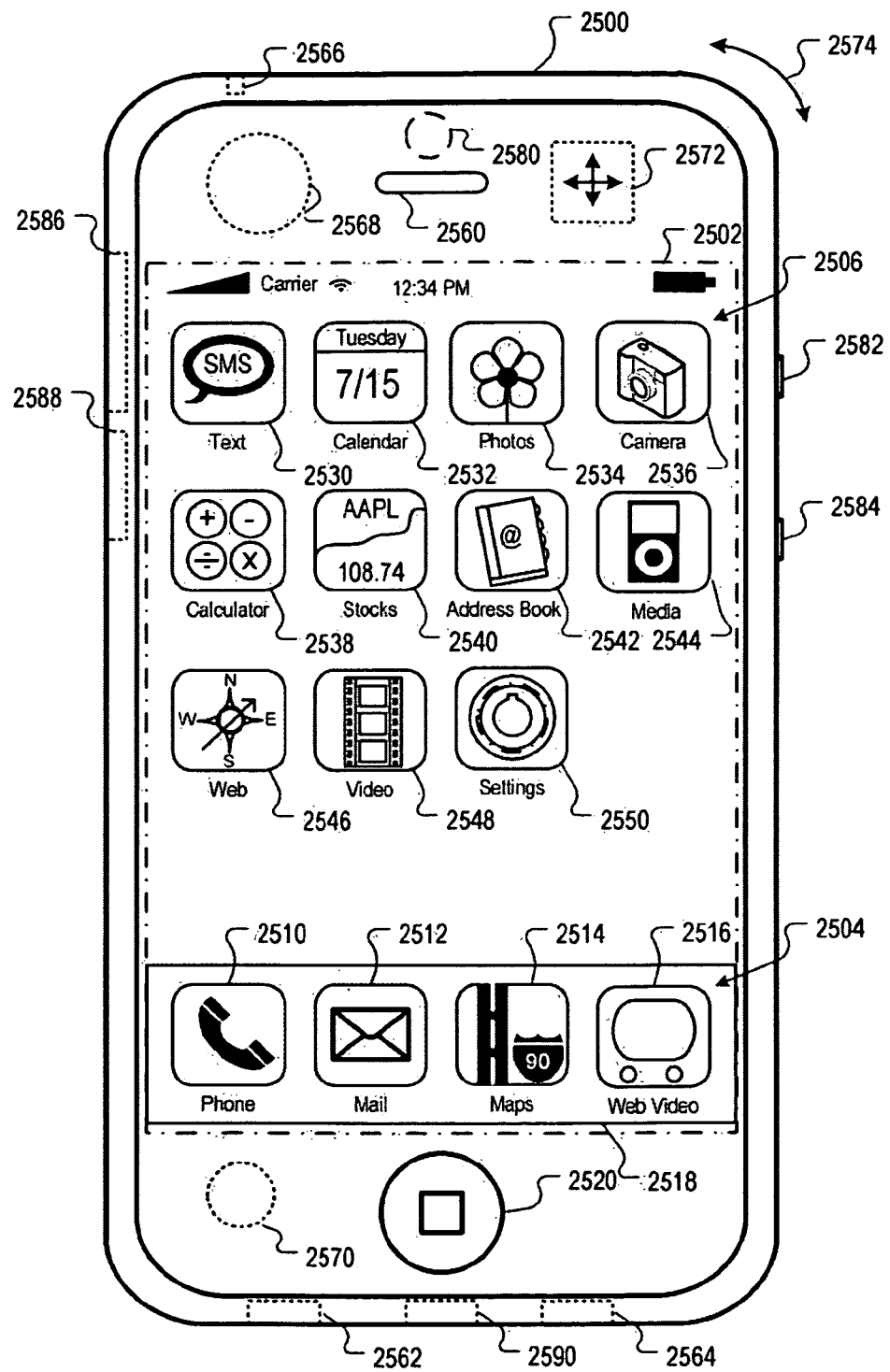
FIG. 5A illustrates an example embodiment of a mobile device.

FIG. 5A illustrates an example mobile device 2500. The mobile device 2500 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 2500 includes a touch-sensitive display 2502. The touch-sensitive display 2502 can be implemented with liquid crystal display (LCD) technology, light emitting polymer display (LPD) technology, or some other display technology. The touch-sensitive display 2502 can be sensitive to haptic and/or tactile contact with a user.

In some implementations, the touch-sensitive display 2502 can include a multi-touch-sensitive display 2502. A multi-touch-sensitive display 2502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 2500 can display one or more graphical user interfaces on the touch-sensitive display 2502 for providing the user access to various system objects and for conveying information to the user. In some implementations, the graphical user interface can include one or more display objects 2504, 2506. In the example shown, the display objects 2504, 2506, are graphic representations of system objects. Some examples of system objects include device functions, applications, windows, files, alerts, events, or other identifiable system objects.

Example Mobile Device Functionality

In some implementations, the mobile device 2500 can implement multiple device functionalities, such as a telephony device, as indicated by a Phone object 2510; an e-mail device, as indicated by the Mail object 2512; a map devices, as indicated by the Maps object 2514; a Wi-Fi base station device (not shown); and a network video transmission and display device, as indicated by the Web Video object 2516. In some implementations, particular display objects 2504, e.g., the Phone object 2510, the Mail object 2512, the Maps object 2514, and the Web Video object 2516, can be displayed in a menu bar 2518. In some implementations, device functionalities can be accessed from a top-level graphical user interface, such as the graphical user interface illustrated in FIG. 5A. Touching one of the objects 2510, 2512, 2514, or 2516 can, for example, invoke a corresponding functionality.

In some implementations, the mobile device 2500 can implement a network distribution functionality. For example, the functionality can enable the user to take the mobile device 2500 and provide access to its associated network while traveling. In particular, the mobile device 2500 can extend Internet access (e.g., Wi-Fi) to other wireless devices in the vicinity. For example, mobile device 2500 can be configured as a base station for one or more devices. As such, mobile device 2500 can grant or deny network access to other wireless devices.

In some implementations, upon invocation of a device functionality, the graphical user interface of the mobile device 2500 changes, or is augmented or replaced with another user interface or user interface elements, to facilitate user access to particular functions associated with the corresponding device functionality. For example, in response to a user touching the Phone object 2510, the graphical user interface of the touch-sensitive display 2502 may present display objects related to various phone functions; likewise, touching of the Mail object 2512 may cause the graphical user interface to present display objects related to various e-mail functions; touching the Maps object 2514 may cause the graphical user interface to present display objects related to various maps functions; and touching the Web Video object 2516 may cause the graphical user interface to present display objects related to various web video functions.

In some implementations, the top-level graphical user interface environment or state of FIG. 5A can be restored by pressing a button 2520 located near the bottom of the mobile device 2500. In some implementations, each corresponding device functionality may have corresponding "home" display objects displayed on the touch-sensitive display 2502, and the graphical user interface environment of FIG. 5A can be restored by pressing the "home" display object.

In some implementations, the top-level graphical user interface can include additional display objects 2506, such as a short messaging service (SMS) object 2530, a Calendar object 2532, a Photos object 2534, a Camera object 2536, a Calculator object 2538, a Stocks object 2540, a Address Book object 2542, a Media object 2544, a Web object 2546, a Video object 2548, a Settings object 2550, and a Notes object (not shown). Touching the SMS display object 2530 can, for example, invoke an SMS messaging environment and supporting functionality; likewise, each selection of a display object 2532, 2534, 2536, 2538, 2540, 2542, 2544, 2546, 2548, and 2550 can invoke a corresponding object environment and functionality.

Additional and/or different display objects can also be displayed in the graphical user interface of FIG. 5A. For example, if the device 2500 is functioning as a base station for other devices, one or more "connection" objects may appear in the graphical user interface to indicate the connection. In some implementations, the display objects 2506 can be configured by a user, e.g., a user may specify which display objects 2506 are displayed, and/or may download additional applications or other software that provides other functionalities and corresponding display objects.

In some implementations, the mobile device 2500 can include one or more input/output (I/O) devices and/or sensor devices. For example, a speaker 2560 and a microphone 2562 can be included to facilitate voice-enabled functionalities, such as phone and voice mail functions. In some implementations, an up/down button 2584 for volume control of the speaker 2560 and the microphone 2562 can be included. The mobile device 2500 can also include an on/off button 2582 for a ring indicator of incoming phone calls. In some implementations, a loud speaker 2564 can be included to facilitate hands-free voice functionalities, such as speaker phone functions. An audio jack 2566 can also be included for use of headphones and/or a microphone.

In some implementations, a proximity sensor 2568 can be included to facilitate the detection of the user positioning the mobile device 2500 proximate to the user's ear and, in response, to disengage the touch-sensitive display 2502 to prevent accidental function invocations. In some implementations, the touch-sensitive display 2502 can be turned off to conserve additional power when the mobile device 2500 is proximate to the user's ear.

Other sensors can also be used. For example, in some implementations, an ambient light sensor 2570 can be utilized to facilitate adjusting the brightness of the touch-sensitive display 2502. In some implementations, an accelerometer 2572 can be utilized to detect movement of the mobile device 2500, as indicated by the directional arrow 2574. Accordingly, display objects and/or media can be presented according to a detected orientation, e.g., portrait or landscape. In some implementations, the mobile device 2500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 2500 or provided as a separate device that can be coupled to the mobile device 2500 through an interface (e.g., port device 2590) to provide access to location-based services.

In some implementations, a port device 2590, e.g., a Universal Serial Bus (USB) port, or a docking port, or some other wired port connection, can be included. The port device 2590 can, for example, be utilized to establish a wired connection to other computing devices, such as other communication devices 2500, network access devices, a personal computer, a printer, a display screen, or other processing devices capable of receiving and/or transmitting data. In some implementations, the port device 2590 allows the mobile device 2500 to synchronize with a host device using one or more protocols, such as, for example, the TCP/IP, HTTP, UDP and any other known protocol.

The mobile device 2500 can also include a camera lens and sensor 2580. In some implementations, the camera lens and sensor 2580 can be located on the back surface of the mobile device 2500. The camera can capture still images and/or video.

The mobile device 2500 can also include one or more wireless communication subsystems, such as an 802.11b/g communication device 2586, and/or a Bluetooth™ communication device 2588. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-level Graphical User Interface

Figure 5B:
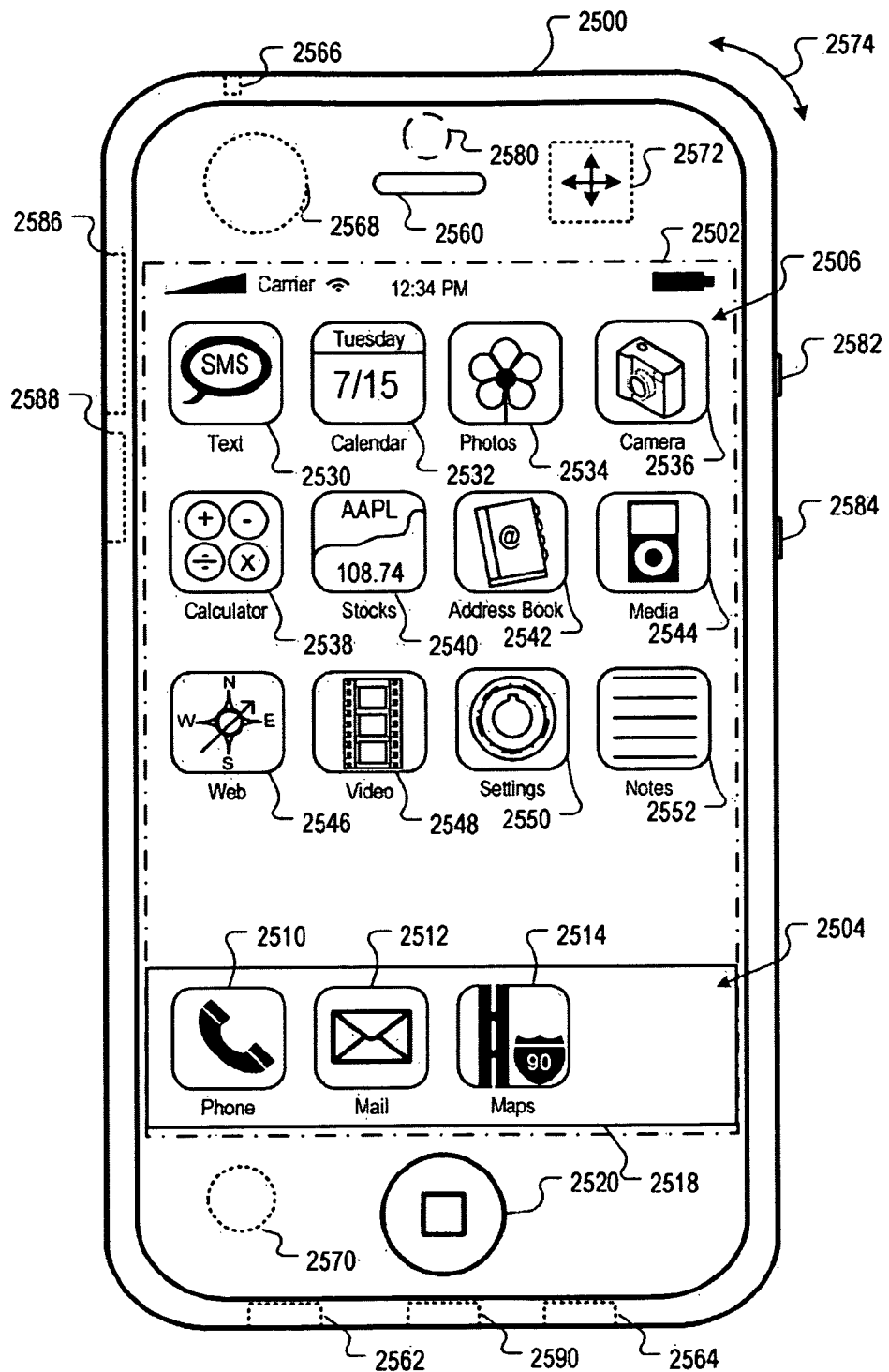
FIG. 5B illustrates an example embodiment of a configurable top-level graphical user interface of a mobile device.

FIG. 5B illustrates another example of configurable top-level graphical user interface of device 2500. The device 2500 can be configured to display a different set of display objects.

In some implementations, each of one or more system objects of device 2500 has a set of system object attributes associated with it; and one of the attributes determines whether a display object for the system object will be rendered in the top-level graphical user interface. This attribute can be set by the system automatically, or by a user through certain programs or system functionalities as described below. FIG. 5B shows an example of how the Notes object 2552 (not shown in FIG. 5A) is added to and the Web Video object 2516 is removed from the top graphical user interface of device 2500 (e.g. such as when the attributes of the Notes system object and the Web Video system object are modified).

Example Mobile Device Architecture

Figure 6:
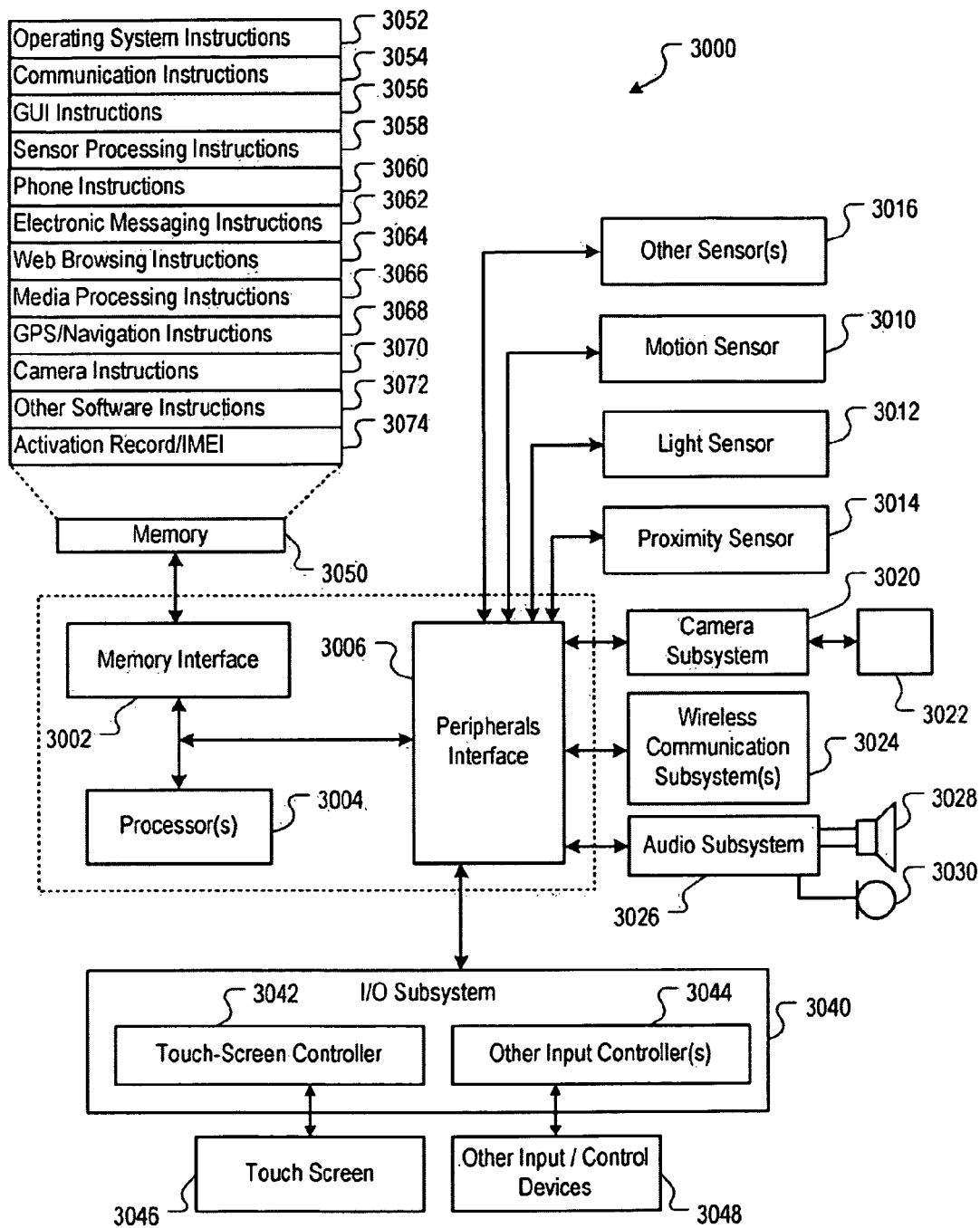
FIG. 6 is a block diagram of an example implementation of a mobile device.

FIG. 6 is a block diagram 3000 of an example implementation of a mobile device (e.g., mobile device 2500). The mobile device can include a memory interface 3002, one or more data processors, image processors and/or central processing units 3004, and a peripherals interface 3006. The memory interface 3002, the one or more processors 3004 and/or the peripherals interface 3006 can be separate components or can be integrated in one or more integrated circuits. The various components in the mobile device can be coupled by one or more communication buses or signal lines.

Sensors, devices, and subsystems can be coupled to the peripherals interface 3006 to facilitate multiple functionalities. For example, a motion sensor 3010, a light sensor 3012, and a proximity sensor 3014 can be coupled to the peripherals interface 3006 to facilitate the orientation, lighting, and proximity functions described with respect to FIG. 5A. Other sensors 3016 can also be connected to the peripherals interface 3006, such as a positioning system (e.g., GPS receiver), a temperature sensor, a biometric sensor, or other sensing device, to facilitate related functionalities.

A camera subsystem 3020 and an optical sensor 3022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 3024, which can include radio frequency receivers and transmitters and/or optical (e.g., infrared) receivers and transmitters. The specific design and implementation of the communication subsystem 3024 can depend on the communication network(s) over which the mobile device is intended to operate. For example, a mobile device can include communication subsystems 3024 designed to operate over a GSM network, a GPRS network, an EDGE network, a Wi-Fi or WiMax network, and a Bluetooth™ network. In particular, the wireless communication subsystems 3024 may include hosting protocols such that the mobile device may be configured as a base station for other wireless devices.

An audio subsystem 3026 can be coupled to a speaker 3028 and a microphone 3030 to facilitate voice-enabled functions, such as voice recognition, voice replication, digital recording, and telephony functions.

The I/O subsystem 3040 can include a touch screen controller 3042 and/or other input controller(s) 3044. The touch-screen controller 3042 can be coupled to a touch screen 3046. The touch screen 3046 and touch screen controller 3042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 3046.

The other input controller(s) 3044 can be coupled to other input/control devices 3048, such as one or more buttons, rocker switches, thumb-wheel, infrared port, USB port, and/or a pointer device such as a stylus. The one or more buttons (not shown) can include an up/down button for volume control of the speaker 3028 and/or the microphone 3030.

In one implementation, a pressing of the button for a first duration may disengage a lock of the touch screen 3046; and a pressing of the button for a second duration that is longer than the first duration may turn power to the mobile device on or off. The user may be able to customize a functionality of one or more of the buttons. The touch screen 3046 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 3002 can be coupled to memory 3050. The memory 3050 can include high-speed random access memory and/or non-volatile memory, such as one or more magnetic disk storage devices, one or more optical storage devices, and/or flash memory (e.g., NAND, NOR). The memory 3050 can store an operating system 3052, such as Darwin, RTXC, LINUX, UNIX, OS X, WINDOWS, or an embedded operating system such as VxWorks. The operating system 3052 may include instructions for handling basic system services and for performing hardware dependent tasks. In some implementations, the operating system 3052 can be a kernel (e.g., UNIX kernel).

The memory 3050 may also store communication instructions 3054 to facilitate communicating with one or more additional devices, one or more computers and/or one or more servers. The memory 3050 may include graphical user interface instructions 3056 to facilitate graphic user interface processing; sensor processing instructions 3058 to facilitate sensor-related processing and functions; phone instructions 3060 to facilitate phone-related processes and functions; electronic messaging instructions 3062 to facilitate electronic-messaging related processes and functions; web browsing instructions 3064 to facilitate web browsing-related processes and functions; media processing instructions 3066 to facilitate media processing-related processes and functions; GPS/Navigation instructions 3068 to facilitate GPS and navigation-related processes and instructions; camera instructions 3070 to facilitate camera-related processes and functions; and/or other software instructions 3072 to facilitate other processes and functions. The memory 3050 may also store other software instructions (not shown), such as web video instructions to facilitate web video-related processes and functions; and/or web shopping instructions to facilitate web shopping-related processes and functions. In some implementations, the media processing instructions 3066 are divided into audio processing instructions and video processing instructions to facilitate audio processing-related processes and functions and video processing-related processes and functions, respectively. An activation record and International Mobile Equipment Identity (IMEI) 3074 or similar hardware identifier can also be stored in memory 3050.

Although the foregoing description has shown, described, and pointed out fundamental novel features of present teachings, it may be understood that various omissions, substitutions, and changes in form of detail of apparatus as illustrated, as well as uses thereof, may be made by those skilled in art, without departing from scope of present teachings. Consequently, scope of present teachings should not be limited to foregoing discussion.

What is claimed is:
1. A method comprising:
   determining, by a computer, a plurality of rendering layers that describe relations of elements to be displayed for a page of content, wherein successive rendering layers are displayed on top of preceding rendering layers;
   determining a first rendering layer in the plurality of rendering layers that is appropriate for hardware compositing support instead of software rendering based on visual characteristics of the elements for the first rendering layer, the visual characteristics defined by style descriptions referred to by the page of content;

generating rendered content for the first rendering layer in the plurality of rendering layers using the hardware compositing support instead of the software rendering;
determining each subsequent rendering layer in the plurality of rendering layers that overlaps the first rendering layer;
generating rendered content for each of the subsequent rendering layers that overlap the first rendering layer using the hardware compositing support instead of the software rendering, wherein the rendered content of each of the subsequent layers generated using the hardware compositing support is composited on top of the rendered content for the first rendering layer as indicated by the plurality of rendering layers; and
for each subsequent rendering layer that does not overlap the first rendering layer, generating rendered content using the software rendering instead of the hardware compositing support.

2. The method of claim 1, further comprising determining hierarchy of rendering layers based on styles specified in the style descriptions that affect the front-to-back ordering of the page elements.

3. The method of claim 1, further comprising determining, for at least one rendering layer, whether that layer uses hardware compositing support.

4. The method of claim 1, further comprising downloading files that describe the page of content.

5. The method of claim 1, further comprising downloading the style descriptions referred to by the page of content.

6. The method of claim 1, further comprising:
minimizing a number and size of hardware compositing layers generated using hardware compositing support.

7. The method of claim 1, further comprising:
comparing a rendered display created from all the rendered layers with an intended display; and
selecting at least one of the subsequent rendering layers that does not overlap the first rendering layer to be generated using the hardware compositing support instead of the software rendering based on the comparing.

8. A non-transitory machine readable storage medium storing executable instructions which when executed by a processor cause the processor to perform operations comprising:
determining a plurality of rendering layers that describe relations of elements to be displayed for a page of content, wherein successive rendering layers are displayed on top of preceding rendering layers;
determining a first rendering layer in the plurality of rendering layers that is appropriate for hardware compositing support instead of software rendering based on visual characteristics of the elements for the first rendering layer, the visual characteristics defined by style descriptions referred to by the page of content;
generating rendered content for the first rendering layer in the plurality of rendering layers using the hardware compositing support instead of the software rendering;
determining each subsequent rendering layer in the plurality of rendering layers that overlaps the first rendering layer;
generating rendered content for each of the subsequent layers that overlap the first rendering layer using the hardware compositing support instead of the software rendering, wherein the rendered content of each of the subsequent layers generated using the hardware compositing support is composited on top of the rendered content for the first rendering layer as indicated by the plurality of rendering layers; and
for each subsequent rendering layer that does not overlap the first rendering layer, generating rendered content using the software rendering instead of the hardware compositing support.

9. The non-transitory machine readable storage medium of claim 8, the operations further comprising determining hierarchy of rendering layers based on styles specified in the style descriptions that affect the front-to-back ordering of the page elements.

10. The non-transitory machine readable storage medium of claim 8, the operations further comprising determining, for at least one rendering layer, whether that layer uses hardware compositing support.

11. The non-transitory machine readable storage medium of claim 8, the operations further comprising downloading files that describe the page of content.

12. The non-transitory machine readable storage medium of claim 8, the operations further comprising downloading the style descriptions referred to by the page of content.

13. The non-transitory machine readable storage medium of claim 8, the operations further comprising:
minimizing a number and size of hardware compositing layers generated using hardware compositing support.

14. The non-transitory machine readable storage medium of claim 8, the operations further comprising:
comparing a rendered display created from all the rendered layers with an intended display; and
selecting at least one of the subsequent rendering layers that does not overlap the first rendering layer to be generated using the hardware compositing support instead of the software rendering based on the comparing.

15. A data processing system comprising:
means for determining, by a hardware device, a plurality of rendering layers that describe relations of elements to be displayed for a page of content, wherein successive rendering layers are displayed on top of preceding rendering layers;
means for determining a first rendering layer in the plurality of rendering layers that is appropriate for hardware compositing support instead of software rendering based on visual characteristics of the elements for the first rendering layer, the visual characteristics defined by style descriptions referred to by the page of content;
means for generating rendered content for the first rendering layer in the plurality of rendering layers using the hardware compositing support instead of the software rendering;
means for determining each subsequent rendering layer in the plurality of rendering layers that overlaps the first rendering layer;
means for generating rendered content for each of the subsequent layers that overlaps the first rendering layer using the hardware compositing support instead of the software rendering, wherein the rendered content of each of the subsequent layers generated using the hardware compositing support is composited on top of the first rendering layer as indicated by the plurality of rendering layers; and
for each subsequent rendering layer that does not overlap the first rendering layer, means for generating rendered content using the software rendering instead of the hardware compositing support.

16. The data processing system of claim 15, further comprising means for determining hierarchy of rendering layers based on styles specified in the style descriptions that affect the front-to-back ordering of the page elements.

17. The data processing system of claim 15, further comprising means for determining, for at least one rendering layer, whether that layer uses hardware compositing support.

18. The data processing system of claim 15, further comprising means for downloading files that describe the page of content.

19. The data processing system of claim 15, further comprising means for downloading the style descriptions referred to by the page of content.

20. The data processing system of claim 15, further comprising:
    means for minimizing a number and size of hardware compositing layers generated using hardware compositing support.

\* \* \* \* \*